United States Patent [19]

Greth

[11] 3,914,281

[45] *Oct. 21, 1975

[54] PROCESS FOR THE PRODUCTION OF SUCCINYLOSUCCINIC DIESTER

[75] Inventor: Erich Greth, Visp, Switzerland

[73] Assignee: Lonza, Ltd., Gampel, Valais, Switzerland

[ * ] Notice: The portion of the term of this patent subsequent to Nov. 27, 1990, has been disclaimed.

[22] Filed: Apr. 3, 1973

[21] Appl. No.: 347,374

[30] Foreign Application Priority Data

Apr. 11, 1972 Switzerland...................... 005280/72

[52] U.S. Cl. ............................................ 260/468 K
[51] Int. Cl.$^2$........................................ C07C 69/74
[58] Field of Search ................................ 260/468 K

[56] References Cited
UNITED STATES PATENTS
3,775,467   11/1973   Greth.................................. 260/483

FOREIGN PATENTS OR APPLICATIONS
7,107,100   2/1971   Japan............................. 260/468 K

OTHER PUBLICATIONS

Sommelet et al., "Bull. Soc. Chim.," 29, (1921), pp. 402–406.

*Primary Examiner*—Anton H. Sutto
*Assistant Examiner*—Michael Shippen
*Attorney, Agent, or Firm*—Christen & Sabol

[57] ABSTRACT

A process for the production of succinylosuccinic acid diester from γ-halogenacetoacetic ester by means of a strong base in an organic solvent. The process includes the improvement which comprises carrying out the reaction in at least one organic solvent at a pH between 8 and 11. The succinylosuccinic diester is separated from the reaction mixture.

28 Claims, No Drawings

PROCESS FOR THE PRODUCTION OF SUCCINYLOSUCCINIC DIESTER

BACKGROUND OF THIS INVENTION

1. Field of this Invention

This invention relates to a process for the production of succinylosuccinic diester from γ-halogenacetoacetic ester by means of at least one strong base in a organic solvent.

2. Prior Art

Succinylosuccinic diester has been produced by conversion form γ-chloroacetoacetic by means of strong bases in organic solvents. The following have been used as solvents; alcohol, aromatics and ether; and the following have been used as strong bases; sodium ethylate, sodium acetate, dimethyl amine, potassium phthalimide and ammonia. If, for example, one operates with ethanol as a solvent and sodium ethylate as a base, then yields of 29 percent (Bull. Soc. Chem. France 29, 1921, pages 402 to 406) and 38.6 percent (C.A. 49, 1955, 926d) have been obtained.

As the above-described known processes produce only small yields, the art has changed over the using succinic diethyl ester as a starting product and reacted this with sodium ethylate. The maximum yield which has been achieved in this way is about 80 percent (U.S. Pat. No. 3,024,268). The disadvantage of this process, however, lies in the fact that the isolation of the succinylosuccinic acid diester is exceedingly cumbersome and time consuming. Furthermore, excessively large quantities of solvents (of the type described in the aforegoing paragraph) are needed.

BROAD DESCRIPTION OF THIS INVENTION

It is the objective of this invention to produce succinylosuccinic diester from γ-halogenacetoacetic ester by means of a simple process in high yields.

This invention involves a process for the production of succinylosuccinic acid diester from γ-halogenacetoacetic ester by means of a base in an organic solvent. The invention includes the improvement of carrying out the reaction in at least one organic solvent which preferably has a dielectric constant of at least 20 at 20°C. The reaction is carried out at a pH between 8 and 11. Preferably the pH is adjusted to about 9.5 by the addition of strong base at the beginning of the reaction and the pH is kept constant at that level during reaction by the continued addition of a base, as needed. Examples of the base are an alkali hydroxide or alkali ethylate. The reaction can be carried out in a mixture of the organic solvents. Preferably the organic solvent has a dielectricity constant between 20 and 50 at 20°C. Preferably the reaction is carried out at a temperature between 0° and 40°C. Preferably the γ-haloacetoacetic ester is a γ-chloroacetoacetic ester. The weight ratio of said organic solvent to γ-haloacetoacetic ester is between 3 : 1 and 8 : 1. The process further includes separating the succinylosuccinic diester from the reaction mixture.

The succinylosuccinic diester can be used for the production of polymers and for the production of quinacridone dye stuffs.

DETAILED DESCRIPTION OF THIS INVENTION

The useful organic solvents must be capable of dissolving the reactant, without reacting with it. Preferred are polar organic solvents having a dielectric constant between 20 and 50 (measured at 20°C). Generally, the useful polar organic solvents are dipolar aprotic solvents.

The preferred polar organic solvent is dimethyl formamide. Other useful polar organic solvents are acetone, dimethyl sulfoxide, acetonitrile, diethyl sulfoxide, benzonitrile, dimethylacetamide, N-methyl formamide, formamide, methyl propionamide and sulfolane (tetramethylenesulfone). Mixtures of polar organic solvents can be used.

Preferably from 3 to 8 parts by weight of solvent are used per one part of reactant or starting material.

The specified pH must be maintained during the reaction. The required pH lies between 8 and 11, preferably between 9 and 10, and most preferably at about 9.5. The pH can be adjusted to the desired level at the beginning of the reaction by the addition of suitable quantities of a strong base to the admixture of the γ-haloacetoacetic ester in the polar organic solvent. The pH is maintained approximately at the same level or within the allowable range during the reaction by continuous or intermittent addition of further amounts of the strong base. Mixtures of strong bases can be used.

The pH can be controlled during the reaction using known methods, for example, electrochemically.

Examples of useful strong and medium bases are the alkali hydroxides, such as, sodium hydroxide, lithium hydroxide and potassium hydroxide, alkaline hydroxides, such as, calcium hydroxide, barium hydroxide, and magnesium hydroxide, alkaline alcoholates, such as calcium ethylate, calcium methylate, calcium propylate, barium ethylate, barium methylate, calcium decylate, magnesium ethylate, barium octylate, calcium isopropylate and magnesium methylate, and alkali alcoholates, such as, sodium ethylate, sodium methylate, sodium isobutylate, lithium ethylate, lithium methylate, sodium pentylate, potassium ethylate, lithium isopropylate, sodium undecylate, potassium methylate, lithium isopropylate, sodium undecylate, potassium methylate, lithium butylate, sodium hexylate and potassium octylate. The alcoholate groups should contain between 1 and 12 carbon atoms.

Examples of other useful strong and medium bases are sodium acetate, dimethyl amine, ammonia, potassium phthalimide, sodium carbonate, sodium metasilicate, trisodium phosphate, ammonium hydroxide, sec-butylamine, diethylbenzylamine, diethylamine, diisoamylamine, diisobutylamine, dimethylbenzylamine, dipropylamine, ethylamine, ethylenediamine, isoamylamine, isobutylamine, isopropylamine, methyl amine, methyldiethylamine, tetramethylenediamine, tripropylamine, trimethylenediamine, trimethylamine, triisobutylamine, triethylamine, n-amylamine, isoamylamine, n-butylamine, iso-butylamine, tert-butylamine, cyclohexylamine, phenylquanidine, potassium fluoride, sodium phenol, and potassium phthalimide. Preferably the strong base is an alkali hydroxide or an alkali ethylate.

The strong and medium bases should have a dissociation constant of at least $1 \times 10^{-5}$ at 25°C., and preferably at least $1 \times 10^{-4}$ at 25°C. The fact that medium strength bases, such as, triethylamine, potassium fluoride, sodium phenol and potassium phthalimide, can be used is an advantage of this process over the prior art processes which require strong bases, such as, sodium hydroxide.

The reaction should be conducted at a temperature between 0° and 40°C., and preferably between 20° and 30°C.

The strong bases can also be used when they are dissolved in lower alcohols. The useful lower (monohydroxy) alcohols can have 1 to 8 carbon atoms, preferably have 1 to 4 carbon atoms and most preferably are methyl or ethyl. Straight and branched chain alcohols can be used. Examples of useful alcohols are methanol, ethanol, 1-propanol, isobutyl alcohol, 2-propanol, tert-buty alcohol, 1-butanol, and 2-butanol.

Alcohols having 2 or more hydroxyl groups can be used (provided they have 1 to 8 carbon atoms), but are not preferred. Examples of such alcohols are glycol, 1,2-propanediol, 1,3-propanediol, 1,2-butanediol, glycerol, 1,3-butanediol, 1,4-butanediol, and 2,3-butanediol. The alcohols have to be liquid at the reaction temperature.

Useful γ-haloacetoacetic esters have the formula:

Wherein R is an alkyl group having 1 to 12 carbon atoms, preferably 1 to 4 carbon atoms, and X is a halogen atom. R can be straight or branched chained. $R_1$ and $R_2$ in the formula for the succinylosuccinic diesters of this invention are the same as R.

The useful halogens herein are chlorine (preferred) and bromine.

Succinylosuccinic diester is also termed succinosuccinic diester or 1,4-dicarbethoxy-2,5-diketo-cyclohexane, and has the formula:

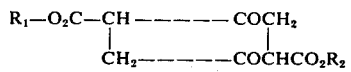

$R_1$ and $R_2$ can be the same or different alkyl groups. The alkyl group can be straight chained or branched chained. Normally the alkyl group should contain 1 to 12 carbon atoms and preferably contains 1 to 4 carbon atoms. Examples of useful alkyl groups are methyl, ethyl, 1-octyl, 2-octyl, 2-methyl-2-octyl, 3-ethyl-3-octyl, 3,7-dimethyl-1-octyl, 1-propyl, 2-propyl, tert-butyl, neopentyl, isobutyl, n-butyl, 2-butyl, 2-ethyl-1-butyl, 3-methyl-1-butyl, 2,3-dimethyl-2-butyl, 3-methyl-2-butyl, 3,3-dimethyl-2-butyl, 1-pentyl, 2-methyl-1-pentyl, 2-pentyl, 3-methyl-1-penthyl, 3-pentyl, 4-methyl-1-pentyl, 2,4-dimethyl-2-pentyl, 3-ethyl-2-methyl-3-pentyl, 2,3,3-trimethyl-2-butyl, 1-heptyl, 2-methyl-2-pentyl, 2-methyl-2-heptyl, 4-methyl-2-pentyl, 3-methyl-3-heptyl, 3-methyl-3-pentyl, 4-methyl-4-heptyl, 2-methyl-3-pentyl, 4-propyl-4-heptyl, 3-methyl-3-pentyl, 4-ethyl-4-heptyl, 2,3-dimethyl-3-pentyl, 2,6-dimethyl-4-heptyl, 2,4-dimethyl-3-pentyl, 1nonyl, 2-methyl-1-nonyl, 2-nonyl, 2,8-dimethyl-5-nonyl, 3-nonyl, 4-nonyl, 1-hendecyl, 5-nonyl, 1-decyl, 2-hendecyl, 4-decyl, 1-hexyl, 2-ethyl,-1-hexyl, 1-dodecyl, 2-hexyl, 3-ethyl-3-hexyl, 6-dodecyl, 3-hexyl, 2-methyl-1-hexyl, 5-methyl-1-hexyl, 2-methyl-2-hexyl, 5-methyl-2-hexyl, 3-methyl-3-hexyl, 5-methyl-3-hexyl, 3-ethyl-5-methyl-3-hexyl, 3-isopropyl-5-methyl-1-hexyl and 2,2,5,5-tetramethyl-3-hexyl.

The alcohol component of the starting ester, of course, depends on the succinylosuccinic acid diester that is to be produced.

The processing of the reaction mixture and the isolation of the succinylosuccinic acid diester is exceedingly simple. Any conventional separation method can be used. After the reaction is completed, water in quantities of 1 to 2 parts, related to 1 part of the solvent, is added to the reaction mixture. The polar solvent mixes with the water and the alkalichlroide formed during the reaction dissolves. The succinylosuccinic diester present as a solid substance is isolated by simple filteration or centrifugation. This is the preferred separation or isolation method. The product obtained in that manner is colorless and has a purity of about 99 percent or higher, determined by titration with tetrabutylammonium hydroxide in pyridine.

EXAMPLE 1

11.88 gm. of γ-chloroacetoacetic ethyl ester were dissolved in 100 ml (110 gm) of dimethyl sulfoxide and the pH value was adjusted to 9.45 with sodium ethylate (dissolved in ethanol). From time to time, additional sodium ethylate was added in order to maintain the pH value between 9 and 10. The conversion temperature ranged between 18° and 20°C. After 72 hours, the reaction mxiture was mixed with 200 ml of water; and the succinylosuccinic diethyl ester was filtered off, washed with water and dried. The yield of succinylosuccinic diethyl ester was 6.84 gm. of or 74.0 percent of theoretical. The product purity was 99.6 percent.

EXAMPLE 2

Example 1 was repeated except that 11.88 gm γ-chloroacetoacetic ethyl ester was dissolved in dimethyl formamide and the reaction was conducted at 0°C. The yield was 6.88 gm. of succinylosuccinic acid diethyl ester, or 72.2 percent. The product purity was 99.8 percent.

EXAMPLE 3

11.88 gm of γ-chloroacetoacetic ethyl ester were dissolved under nitrogen in 100 ml of dimethyl formamide and the pH value was adjusted to 9.5 by means of NaOH (dissolved in methanol). The pH was controlled by an electrically recording pH meter, which caused the continued addition of NaOH (drop by drop) as needed so that a pH of 9,4 to 9.6 was maintained. The reaction temperature was 30°C. The reaction was stopped after 20 hours. The reaction mixture was mixed with 200 ml of water and the succinylosuccinic acid diethyl ester was isolated. The yield was 80.1 percent and the product had a purity of 99.6 percent.

EXAMPLE 4

Example 3 was repeated except that 11.88 gm. of γ-chloroacetoacetic ethyl ester was dissolved in diemthyl formamide, and was reacted with KOH (dissolved in ethanol) at a pH which was kept constant between 9.4 and 9.7. The yield was 72.7 percent of the theoretical.

EXAMPLE 5

Example 3 was repeated except that 11.88 gm of γ-chloroacetoacetic ethyl ester, was dissolved in acetonitrile and was reacted with NaOH (dissolved in ethanol). The yield was 76.6 percent.

EXAMPLE 6

Example 3 was repeated except that 11.88 gm of

γ-chloroacetoacetic ethyl ester were dissolved in acetone and were reacted with NaOH (dissolved in ethanol). The yield was 72.0 percent.

EXAMPLE 7

Example 3 was repeated except that 11.274 gm of γ-chloroacetoacetic methy ester were reacted. 6.387 gm of succinylosuccinic dimethyl ester was obtained. The product yield was 74.8 percent; and the product had a melting point of 153.4°C.

EXAMPLE 8

Example 3 was repeated except that 12.685 gm of γ-chloroacetoacetic isopropyl ester were reacted. 6.898 gm of succinylosuccinic diisopropyl ester were obtained. The product yield was 68.3 percent; and the product had a melting point of 102.8°C.

Elementary analysis ($C_{14}H_{20}O_6$)

|  | C | H | O |
|---|---|---|---|
| Found: | 59.3% | 7.1% | 33.6% |
| Calculated | 59.14% | 7.09% | 33.76% |

EXAMPLE 9

Example 1 was repeated except that γ-bromoacetoacetic ethyl ester was used in place of the γ-chloroacetoacetic ethyl ester.

EXAMPLE 10

Example 1 was repeated except that γ-bromoacetoacetic methyl ester was used in place of the γ-chloroacetoacetic ethyl ester.

EXAMPLE 11

Example 1 was repeated except that γ-chloroacetoacetic 2-ethyl-1-hexyl ester was used in place of the γ-chloroacetoacetic ethyl ester.

EXAMPLE 12

Example 1 was repeated except that γ-chloroacetoacetic ethyl-1-hexyl ester was used in place of the γ-chloroacetoacetic ethyl ester.

EXAMPLE 13

100 ml of dimethyl sulfoxide, 50 ml of ethanol, 11.6 gm. of potassium fluoride as the base and 11.8 gm of γ-chloroacetoacetic ethyl ester produced a yield of 84.5 percent. The reaction temperature was 0°C.

EXAMPLE 14

Example 1 was repeated except that toluene was used as the solvent (100 ml) and sodium phenolate was used to adjust and maintain the pH. The yield was 70.5 percent.

EXAMPLES 15 and 16

Example 1 was repeated except that acetonitrile (100 ml) was used as the solvent and sodium hydroxide in ethanol was used as the base. A yield of 76.6 percent resulted. Repeting the same experiment, but using acetone as the solvent, a yield of 72 percent was achieved.

EXAMPLE 17

Example 13 was repeated except that γ-bromoacetoacetic ethyl ester was used in place of the γ-chloroacetoacetic ethyl ester and a reaction temperature of 25°C. was used.

EXAMPLE 18

Example 13 was repeated except that γ-bromoacetoacetic 2-hexyl ester was used in place of the γ-chloroacetoacetic ethyl ester.

What is claimed is:

1. A process for the production of succinylosuccinic acid diester which comprises reacting a γ-haloacetoacetic ester selected from the group consisting of γ-bromoacetoacetic ester and γ-chloroacetoacetic ester, with a strong or medium base at a pH between 8 and 11 in a solvent system consisting essentially of a major amount of at least one or a mixture of dipolar aprotic solvents, each said dipolar aprotic solvent or solvents having a dielectric constant between 20 and 50, measured at 20°C., and maintaining said pH between 8 and 11 during said reaction by continuous or intermittent addition of further amounts of said strong or medium base.

2. A process as claimed in claim 1 wherein said reaction is carried out in said mixture of said dipolar aprotic solvents.

3. A process as claimed in claim 1 wherein said reaction is carried out at a pH between 9 and 10.

4. A process as claimed in claim 3 wherein said reaction is carried out in said mixture of said dipolar aprotic solvents.

5. A process as claimed in claim 1 wherein said reaction is carried out at a temperature between 0° and 40°C.

6. A process as claimed in claim 5 wherein the weight ratio of said solvent system to said γ-haloacetoacetic ester is between 3:1 and 8:1.

7. A process as claimed in claim 6 wherein said strong base is an alkali hydroxide or an alkali ethylate.

8. A process as claimed in claim 6 wherein said γ-haloacetoacetic ester is a γ-chloroacetoacetic ester.

9. A process as claimed in claim 6 wherein said γ-haloacetoacetic ester is a γ-bromoacetoacetic ester.

10. A process as claimed in claim 1 wherein said strong base is dissolved in a lower alcohol.

11. A process as claimed in claim 10 wherein said lower alcohol is ethanol.

12. A process as claimed in claim 10 wherein said lower alcohol is methanol.

13. A process as claimed in claim 10 wherein said lower alcohol has one to 8 carbon atoms.

14. A process as claimed in claim 1 wherein said dipolar aprotic solvent is dimethyl formamide.

15. A process as claimed in claim 1 wherein said dipolar aprotic solvent is diethyl sulfoxide.

16. A process as claimed in claim 1 wherein said strong base is sodium ethylate.

17. A process as claimed in claim 1 wherein said strong base is sodium hydroxide.

18. A process as claimed in claim 1 wherein said strong base is potassium hydroxide.

19. A process as claimed in claim 1 wherein said γ-haloacetoacetic ester is γ-chloroacetoacetic ethyl ester.

20. A process as claimed in claim 1 wherein said γ-haloacetoacetic ester is γ-chloroacetoacetic isopropyl ester.

21. A process as claimed in claim 1 wherein said γ-haloacetoacetic ester is γ-chloroacetoacetic methyl ester.

22. A process as claimed in claim 1 wherein said strong or medium base has a dissociation constant of at least $1 \times 10^{-5}$, measured at 25°C.

23. A process as claimed in claim 1 wherein said succinylsuccinic diester is separated from the reaction mixture.

24. A process as claimed in claim 23 wherein said separation is achieved after said reaction is completed by adding water in quantities of 1 to 2 parts, related to 1 part of said solvent, to said reaction mixture, said solvent mixing with said water and the alkalichloride or alkalibromide formed during said reaction dissolving and then said succinylsuccinic diester, present as a solid substance, is isolated by simple filteration or centrifugation.

25. A process as claimed in claim 1 wherein said γ-haloacetoacetic ester has the formula:
$XCH_2COCH_2CO_2R$.
wherein R is a straight or branched chained alkyl group having 1 to 12 carbon atoms and X is a chlorine atom or a bromine atom, and wherein said succinylosuccinic diester has the formula:

$$R_1-O_2C-CH-----COCH_2$$
$$\phantom{R_1-O_2C-}|\phantom{CH-----CO}|$$
$$\phantom{R_1-O_2C-}CH_2------COCHCO_2R_2$$

wherein $R_1$ and $R_2$ are each an alkyl straight chained or branch chained group having 1 to 12 carbon atoms.

26. A process as claimed in claim 25 wherein R, $R_1$ and $R_2$, each have 1 to 4 carbon atoms.

27. A process for the production of succinylosuccinic acid diester which comprises reacting a γ-haloacetoacetic ester selected from the group consisting of γ-bromoacetoacetic ester and γ-chloroacetoacetic ester, with a strong or medium base at a pH between 8 and 11 in a solvent system consisting essentially of a major amount of at least one or a mixture of dipolar aprotic solvents, each said dipolar aprotic solvent or solvents having a dielectric constant between 20 and 50, measured at 20°C., and said pH being adjusted to about 9.5 by the addition of said strong base at the beginning of said reaction and then being kept constant at that level during said reaction by the continued addition of said strong base, as needed.

28. A process for the production of succinylosuccinic acid diester which comprises reacting a γ-haloacetoacetic ester selected from the group consisting of γ-bromoacetoacetic ester and γ-chloroacetoacetic ester, with a strong or medium base at a pH between 8 and 11 in a solvent system consisting esentially of a major amount of at least one or a mixture of dipolar aprotic solvents, each said dipolar aprotic solvent having a dielectric constant between 20 and 50, measured at 20°C., and said pH being adjusted to a desired level at the beginning of said reaction by the addition of a suitable quantity of said strong base or medium base to said admixture of said γ-haloacetoacetic ester in said dipolar aprotic solvent, and then being maintained approximately at the same level during said reaction by continuous or intermittent addition of further amounts of said strong or medium base.

* * * * *